May 26, 1970 R. C. MILLER ET AL 3,514,099

DOCUMENT HANDLING APPARATUS

Filed June 11, 1968

*INVENTOR*

ROBERT C. MILLER

JOHN H. SHERER JR.

*BY* J. Jancin Jr.

*ATTORNEY*

United States Patent Office 3,514,099

Patented May 26, 1970

3,514,099

DOCUMENT HANDLING APPARATUS

Robert C. Miller, Englishtown, N.J., and John H. Sherer, Jr., Kirkwood, N.Y., assignors to International Business Machines Corporation, Armonk, N.Y., a corporation of New York Filed June 11, 1968, Ser. No. 736,120

Int. Cl. B65h *5/06*

U.S. Cl. 271—51 10 Claims

ABSTRACT OF THE DISCLOSURE

Document handling apparatus for receiving documents from a source and processing the documents so as to exit the documents in a timed relationship to each other comprising resilient metering rolls to move a document via guide means to a timing feed roll aligned parallel to a metering roll and having a surface velocity greater than that of said metering roll, whereby the timing of the document is advanced; the timing feed roll characterized by having position adjusting means for allowing the timing feed roll to be continuously movable along the periphery of said metering roll, allowing earlier or later engagement of the document to adjust its timing, adjustment being made during operation of the apparatus.

FIELD OF THE INVENTION

Document handling apparatus for moving documents from a first location to a second location characterized by the ability to adjust, fix, or otherwise influence the phase relation of documents entering the apparatus from the first location and leaving the apparatus to a second location; generally for sorting, filing, or stacking purposes. Such apparatus may include rolls, pulleys, belts, chains, sensors, or any combination of such components.

PRIOR ART

In the art of stacking and sorting documents, it is often desirable to be able to take a stack of documents, enter data upon or read data from such documents, and then pass the documents on for further operations. In some situations, the document will be passed on in a synchronous manner, that is, every document bears the same timed relation to the preceding and following document. In other situations, where the time of entering data upon or reading data from the document varies as a function of each document, the documents will be passed on in a non-synchronous order. For further handling of the documents, it is generally desirable to adjust the phase relation or timing of the document into a synchronous order. This is most often done by passing the documents through some document handling apparatus which readjusts the phase of the documents as the documents pass through the apparatus, and exits them onto, for example, a moving belt to carry the documents to a later processing station.

An example of an apparatus where documents leave a reading station in a non-synchronously timed manner is in commercial check reading apparatus within banking systems or optical readers. The period that a check will spend within the check reading apparatus beneath the reading heads is a function of the amount of information present upon the check. Thus, checks enter the system along a movable belt to a read station; and the check is momentarily delayed for reading, for a period of time different from the preceding and next following check. The check is then exited along another belt.

It is clear that a series of checks will thus leave the reading station in an unsynchronized or untimed manner.

Readjusting these checks into a timed manner for further handling presents many difficulties. As no two checks are in the same timed relation when entering a document handling apparatus to readjust their timing, the apparatus must be continually adjustable to handle documents on an individual basis. The apparatus must also be rapid, that is, must be able to handle a high number of checks in a short period of time. Further, the apparatus must be simple so as to be reliable, and must not damage the document.

Where documents enter a document handling apparatus in synchronization or timed order, it is often desirable to change that timing. It is clear that any apparatus for doing this should also be economical, virtually maintenance free, and should be able to be readily adjusted as to the output timing, without having to shutdown the unit. Thus, an operator during operation of such apparatus should be able to adjust the machine without having to shutdown the apparatus.

Prior art units generally require that the unit be shutdown for timing adjustment, which then requires adjustment of various split gears, mesh gears, cam, and generally a cumbersome amount of equipment. Such equipment consequently is expensive to use due to the shutdown time, and expensive to purchase and maintain due to the complexity of the parts.

An object of this invention is to allow timing feed control within a document handling apparatus in an inexpensive manner.

A further object of this invention is to allow continuous adjustment of the document timing during operation of the document handling apparatus.

A further object of this invention is to allow construction of a document handling apparatus allowing timing feed control utilizing a minimum number of parts for ease of operation, and economy of construction.

Still another object of this invention is to allow a single document handling apparatus to handle incoming documents whether they be in timed or untimed relationship in incoming order, and to process such documents so as to exit such documents in a timed relationship to each other.

SUMMARY OF THE INVENTION

These and other objects are met by the apparatus of this invention. Briefly, the apparatus of this invention comprises a pair of resiliently mounted metering feed rolls for moving a document from a document feed means through said rolls; guide means for guiding the document along the periphery of one of the metering rolls; and a timing feed roll having a surface velocity greater than that of said metering roll when said apparatus is in operation, for advancing the document guided by the guide means; and position adjusting means for adjusting the position of the timing feed roll. The timing feed roll is continuously adjustable along the periphery of the metering roll, allowing earlier or later engagement and thus earlier or later advancement of the document, during operation of the apparatus. The earlier the engagement with the document, the earlier it will arrive at its destination, and vice versa. Thus, in line, or "during operation" timing control is achieved.

The foregoing and other objects, features and advantages of the invention will be apparent from the following more particular description of preferred embodiments of the invention, as illustrated in the accompanying drawings.

GENERAL DESCRIPTION

Figure 1:
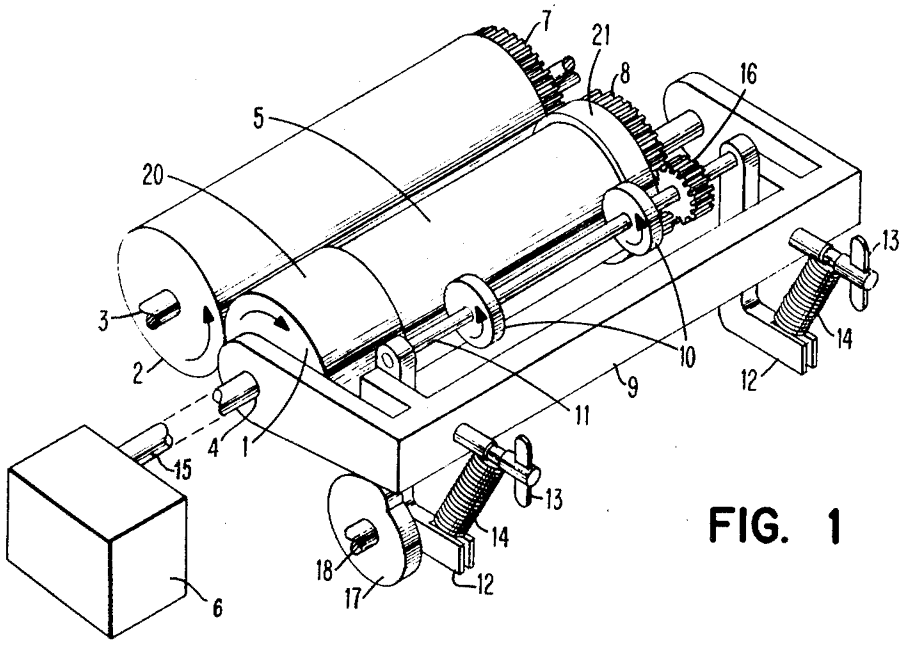
FIG. 1 illustrates a preferred embodiment of the invention showing two equal diameter metering rolls and adjustable timing feed rolls, interconnected to operate from a single drive means.

This invention will best be understood by initially referring to a preferred embodiment of the document handling apparatus. A preferred embodiment may be seen in part in FIG. 1. FIG. 1 shows a document handling apparatus comprising the following parts: a first metering feed roll 1, and a second metering feed roll 2. Metering feed rolls 1 and 2 may be mounted via axial rotation points 3 and 4 to the frame of the unit, not shown. In the embodiment being described, metering feed rolls 1 and 2 are of equal diameter, except for an area 5 upon the first metering feed roll, which is of a slightly less diameter. This area 5 comprises a freely rotatable area, such as a sleeve riding on bearings, thus making metering feed roll 1 a compound roller, that is, comprised of two discrete portions.

At one end of the second metering feed roll 2 there is located a series of gear teeth 7, and on the first metering feed roll 1 a corresponding set of gear teeth 8.

Attached about shaft 15 at axial rotation point 4 is a member 9 upon which is supported timing feed rolls 10 by a shaft 11 attached via L-members 12 to member 9. Wing-nuts 13 are designed to allow adjustment of spring pressure through springs 14 to increase or decrease the resiliency or back pressure of the feed rolls in contact with the free rolling area 5. Also attached on shaft 11 is a roller having gear teeth 16 to mesh with gear teeth 8. Member 11 is designed to be angularly rotatable about the periphery of first metering roll 1, by use of a position adjusting means that raises or lowers the angular position of member 9 from a fixed reference point.

In one embodiment, this position adjusting means, as shown in FIG. 1, comprises an eccentric cam 17 rotatable about a "center" support 18, which may be operated either manually, or may be connected to some servo mechanism. Thus, the position adjusting means may be something as simple as the cam shown, or more complex means to be discussed later.

The first and second metering rolls 1, 2 are resiliently mounted relative to each other, either by choice of materials, such as a rubber or flexible type material, or by spring loading the metering rolls in connection with their attachment to the frame. Thus, the gap between the metering rolls may be adjusted, or the rolls may be touching, but in either case an object introduced between the rolls when the rolls are operating will cause the rolls to resiliently react as the object is pulled or moved through the rolls, and the object may thus be of varying thickness.

In operation, the unit operates as follows. Referring still to FIG. 1, a drive means 6, such as an electric motor connected to drive shaft 15 connected to first metering roll 1 via axial connecting point 4, serves to rotate the first metering roll 1, having two areas 20, 21 thereon of the same diameter as the second metering roll 2. Rotation in a clockwise direction of the first metering roll causes, by intermeshing of gears 7, 8, and 16, the second metering roll 2 to rotate in a counter-clockwise direction, and the timing feed rolls 10 to rotate in a counter-clockwise direction. The timing feed roll 10 contacts the free rolling surface 5, although a gap is allowable and may be adjusted for.

A document fed by document feed means, not shown, is fed to the contact point of the first and second metering feed rolls. The feed rolls nip the document, and pull it between the rolls. The width of the document causes the resilient rolls to slightly contract, but in turn causes their frictional pressures to be applied against the document, thus moving the document between the feed rolls. A guide means, not shown, causes the document to be moved in a direction about the periphery of the first metering feed roll 1. The document is wider than the area 20 on the first metering feed roll, and thus will intercept timing feed roll 10 as the document is guided via the guide means. Document feed roll 10 will cause a slight depression upon the document as it engages with the document by resilient frictional contact, nipping and moving the document similar to that of the metering feed rolls. The surface velocity of the timing feed roll 10, driven by the first metering feed roll 1 via gear 16 meshing with gear 8, is greater than the surface velocity upon either area 20 or area 21. Thus, the timing feed roll 10 nips the document and advances it to a greater velocity than the document had initially prior to reaching the timing feed roll contact point.

Thus the document travels part way along the first metering roll at velocity $V_1$, consuming a time $T_1$; and the balance of the distance at a velocity $V_2$, consuming a time $T_2$. The total time of travel equals $T_1+T_2$; and as $T_2$ is adjustable by adjusting the distance of travel at $V_2$ by adjusting the position of the timing feed roll along the metering feed roll, the desired timing sequencing $T_{desired}$ is achieved, as $T_{desired}=T_1+T_2$. This will be discussed again later.

The free rolling surface 5 reduces friction, and allows faster acceleration of the document by reducing drag and inertia effects.

It is possible that a document may be of a size such that part of the document is still being moved through the metering feed rolls when the leading edge of the document contacts the timing feed rolls. In this case, the materials of the timing feed roll and the metering feed rolls are chosen such that slippage may occur between the metering feed rolls, as the timing feed roll frictionally advances the document.

Figure 2:
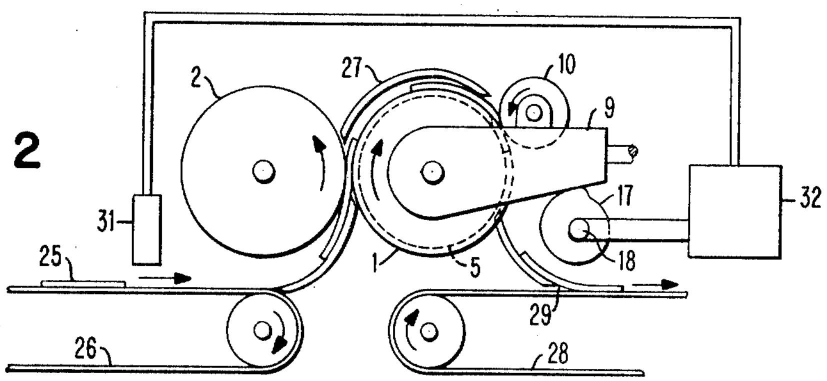
FIG. 2 schematically shows discrete documents being advanced, including sensing means connected to servo mechanism means for continuous adjustment of the position adjusting means, for handling non-uniformly timed incoming documents.

The operation of the invention may further be seen from FIG. 2. FIG. 2 shows a document 25 being advanced along a document feed means 26, such as a conveyor belt, and then being fed to the contact points between the metering feed rolls 1 and 2. A guide means 27 guides the document to contact with the timing feed roll 10. Due to the depressed area 5, the document is shown being slightly compressed. If a punch record card is being utilized as the document, for example, the depression need only be on the order of approximately .007". The document is then shown after being accelerated by the timing feed roll 10 leaving along an exit means 28, which may be for example, a conveyor belt. The distance between the initial contact point of the metering feed rolls 1 and 2, and contact point 29 between the exiting card and the exit conveyor 28 is known. The time it takes for a document to traverse that distance is a function of the velocity with which the document travels across that distance. This velocity in turn is comprised of two components: the velocity $V_1$ with which the card is moved between the metering feed rolls, which is constant until contact of the document with the timing feed roll 10. The timing feed roll 10 accelerates the document to a higher or second velocity $V_2$ which is the velocity the card maintains from point of contact with the timing feed roll to contact point 29 with the exit conveyer 28.

Thus, in the first situation when documents 25 are being introduced between the metering feed rolls at a timed rate, they will leave the document handling apparatus also at a timed rate. The time interval between entering the apparatus and contacting the exit belt 28 may be controlled by adjusting the position of the timing feed roll 10 along the periphery of the first metering feed roll 1. Where cards are introduced between the feed rolls at a constant rate, a single adjustment by an operator is all that is necessary to get the desired timing of the outgoing card.

A different situation exists where documents are fed to the contact point between the metering feed rolls at an untimed or unsynchronized rate. In such situations, it is necessary to continually adjust the timing of the document by forwarding or retarding the position of the timing feed roll 10 along the periphery of the first metering feed roll 1, such that the time T between entry at the metering feed rolls contact point and exit point 29 is constant. This is done by having a sensing means 31 located along the document feed means path. The sensing means 31 generates a signal, and sends the signal to a servo mechanism 32, which is responsive to such signal, for causing the position adjusting means 18, if a cam, or other means, such as micrometer or screw adjustments, to continuously vary the position of member 9, causing timing feed roll 10 to engage the document earlier or later along the periphery of the first metering feed roll 1. Thus, that portion of the path through which the card travels between the contact points of the metering feed rolls and contact point 29, will have different times at the velocities $V_1$ and $V_2$ over varying distances. In this manner, if the position adjusting means is chosen to have an adjustment range within the known out of sequence timing of the incoming cards, all cards may be timed such as to travel the distance between contact of the metering feed rolls and the exit point 29 over the same time interval, thus restoring the cards to synchronization.

Figure 3:
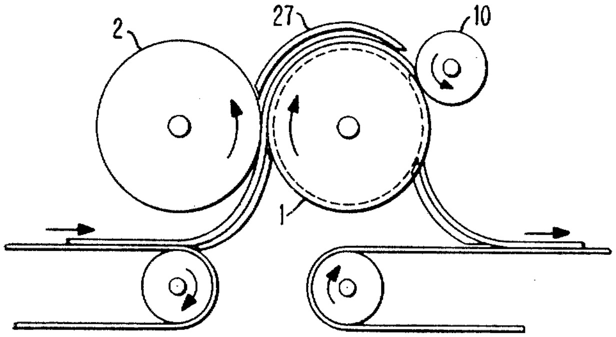
FIG. 3 schematically shows a "continuous web" document being advanced through the apparatus of this invention.

FIG. 3 illustrates a situation where a "continuous web" document is going through the apparatus. Here, part of the document is still being moved by the metering feed rolls 1, 2 while it is being advanced by the timing feed roll 10. To prevent tearing of the document, it is clearly necessary that slippage occur, and that such slippage best occurs at the contact point between the metering feed rolls. This may be done by choice of materials, by choice of the spring pressure placed against the rollers if spring loaded, or by other means well known in the art. The resiliency of the timing feed roll 10 against the first metering feed roll 1 may also be controlled by choice of materials, and by the spring pressure applied, both well known in the art.

While in the preferred embodiment, the timing feed roll 10, and the metering feed rolls 1, 2 are interconnected by gear teeth, requiring but a single drive means, it is clear that the second metering feed roll may be free rolling, and thus of different size than the first metering feed roll; the first metering feed roll need not have a depressed area, or a depressed area that is free rolling, but may be of uniform diameter, in which case advancement by the timing feed roll 10 requires some slippage of the document against the first metering feed roll 1. This may be easily achieved. The unit, however, is more efficient with a free rolling area 5, comprising a compound roller as shown. Further, the timing feed rolls 10 need not be smaller than the diameter of the first metering feed roll 1. If independently driven, all that is necessary is that the surface velocity of the timing feed roll be greater than the surface velocity of the metering feed roll 1, so as to allow advancement of the timing of the card.

The timing feed rolls need not be adjusted as shown, or attached to a member 9 as shown. However, it is clear that the metering feed rolls must be attached to the frame of the unit for reference relative to the position adjusting means to be utilized. In the embodiment shown in FIG. 1, gravity will allow the position of the timing feed roll holding member 9 to fall by gravity and be raised by the position adjusting means. Position adjusting means, shown as cam 17, having a knob 18 thereon, may be manually operated, or may be operated with a servo mechanism, such as shown in FIG. 2 as servo mechanism 32, connected with a sensing means 31. It is clearly important, however, that the timing feed rolls be angularly rotatable by some means about the periphery of the first metering feed roll, to allow timing adjustment. In one particular banking system, it has been found that a depressed area in the first metering feed roll 1, comprising free rolling area 5, need only be depressed .007", and that the amount of deflection necessary from a given reference point via a cam mechanism, as shown by cam 17, need be only .030", to adjust for an untimed feed having a variation of no greater than .030", document to document.

Where an untimed document feed exists, and an adjustment as small as .030" is utilized, it is easy for a sensing-servo mechanism combination, such as those well known in the art, to continually adjust the position adjusting means to continually vary the position of the timing feed roll. Since it is known that time equals distance over velocity, and, the distance a document travels going through this apparatus is known, that relation can be expressed as $T_{desired}=T_1+T_2$, where $T_1$ equals velocity $V_1$, generated by the movement of the document through the metering feed rolls divided into the distance $D_1$ to be traversed at that velocity, which is the distance from the contact point of the metering feed rolls to the contact point of the timing feed roll with the document; plus $V_2$, which is the velocity the document leaves the timing feed roll with, divided into the distance $D_2$ between contact points of the timing feed roll with the metering feed roll, and the exit point of the document. Thus, $$T_{desired}=D_1/V_1+D_2/V_2=T_1+T_2$$

It is thus clear that within the design limits of any given system, chosen as desired, the timing of an irregularly timed entering document may be adjusted.

It is also clear from FIG. 1, that while a plurality of timing feed rolls 10 are shown, a single feed roll may be utilized. Thus, in sum, the document handling apparatus of this invention comprises a frame having resiliently mounted pressure metering rolls supported by said frame, for nipping and frictionally moving documents fed between the metering rolls from a document feed means when the metering rolls are rotating, via a guide means, to contact with a timing feed roll that is peripherally adjustable via position adjusting means along the periphery of the chosen metering roll. The position adjusting means is attached to the frame for reference, and allows continuous adjustment of the position of the timing feed roll along the periphery of the first metering roll, allowing the position at which the timing feed roll receives the document guided by the guide means to be varied for timing changes, while the apparatus is in operation, and drive means for driving the metering roll and the timing feed roll. It is preferable that the materials chosen be such as to allow slippage between the metering feed roll relative to any slippage that can occur at the timing feed roll-document contact point, should any slippage be necessary by the size of the document.

Thus, the objects of this invention have been met by the document handling apparatus described above. The simplicity of the system, as shown in the preferred embodiment, is inexpensive to build, requiring but a single drive means, and simple components otherwise. Continuous adjustment, either manually as would be used for regularly timed incoming documents, or through an automatic servo mechanism system, for irregularly timed documents, is allowed.

While the invention has been particularly shown and described with reference to a preferred embodiment thereof, it will be understood by those skilled in the art that various changes in form and details may be made therein without departing from the spirit and scope of the invention.

What is claimed is:

1. Document handling apparatus for receiving documents from a source and processing the documents so as to exit the documents from said apparatus in a timed relationship to each other by varying the velocity and thus the time of document travel along a constant length path in said apparatus, comprising:

- a frame;
- pressure metering rolls supported by said frame, for nipping and frictionally moving at a first velocity documents fed between said metering rolls from document feed means when said metering rolls are rotating;
- guide means for guiding documents moved by said metering rolls along a part of the periphery of a first of said metering rolls;
- at least one timing feed roll aligned in parallel relationship to said first of said metering rolls and axially rotatable in the direction opposite to said first of said metering rolls, located along the periphery of said first of said metering rolls to resiliently receive and frictionally advance at a second velocity greater than said first velocity the documents moved from said metering rolls and guided along the periphery of said first of said metering rolls by said guide means, when said timing feed roll is rotating with a surface velocity greater than that of said first of said metering rolls; and
- position adjusting means attached to said frame, allowing continuous adjustment of the position of said timing feed roll along the periphery of said first of said metering rolls, allowing the position at which the timing feed roll receives the document guided by said guide means to be varied for timing changes, while said apparatus is in operation; and
- drive means for driving said metering rolls and said timing feed roll.

2. The document handling apparatus of claim 1 wherein said first of said metering rolls comprises at least one portion thereon of lesser diameter than that portion of said first of said metering rolls that nips a document fed from the document feed means, said lesser diameter portion located opposite from and not less in width than a corresponding timing feed roll.

3. The document handling apparatus of claim 2 wherein said lesser diameter portion is freely rotatable relative to the remaining portions of said first of said metering rolls.

4. The document handling apparatus of claim 1 wherein said timing feed roll is supported by a member connected to and rotatable about the axis of said first of said metering rolls, allowing peripheral alignment between said timing feed roll and said first of said metering rolls at any chosen position along the periphery of said first of said metering rolls.

5. The document handling apparatus of claim 4 wherein said position adjusting means attached to said frame comprises a cam positioned to contact said member, to raise and lower said member and thus adjust the position of said timing feed roll along the periphery of said first of said metering rolls as said cam is rotated.

6. The document handling apparatus of claim 1 wherein said timing feed roll is of a lesser diameter than said first of said metering rolls, said timing feed roll being supported by a shaft having a gear tooth area intermeshing with a gear tooth area upon said first of said metering rolls, said shaft of lesser diameter than said first of said metering rolls, whereby upon rotation of either roll, said timing feed roll inherently rotates at higher surface velocity than said first of said metering rolls.

7. The document handling apparatus of claim 1 including sensing means located along the document feed means for sensing the position of a document prior to entry into said metering rolls, and generating a signal relating to the time of sensing; and a servo mechanism responsive to said signal for adjusting the time of contact of said feed roll with said document by causing said position adjusting means to vary the position of said timing feed roll along the periphery of said first of said metering rolls as desired to achieve the desired timing from initial untimed incoming documents.

8. The document handling apparatus of claim 1 wherein the materials and pressure relationship between said metering rolls and said timing feed roll on said first of said metering rolls are chosen to allow slippage of a document being moved between said metering roll when a greater advancing force is placed upon the document at the contact position of said first of said metering rolls and said timing feed roll.

9. The document handling apparatus of claim 1 wherein said pressure metering rolls are resiliently mounted.

10. Document handling apparatus for receiving documents from a source and processing the documents so as to exit the documents from said apparatus in a timed relationship to each other by varying the velocity and thus the time of document travel along a constant length path in said apparatus, comprising:

- a metering feed roll for nipping documents fed from a document feed means and moving the documents along the periphery of said metering roll at a first velocity;
- a timing feed roll adjustable along the periphery of said metering feed roll for nipping and advancing the document originally moved by said metering feed roll to a second velocity greater than said first velocity when said timing feed roll is rotating at a greater surface velocity than said metering feed roll; and
- means for rotating said metering feed roll and said timing feed rolls.

References Cited

UNITED STATES PATENTS 3,199,864 8/1965 Irvine ---------------- 271—51

EVON C. BLUNK, Primary Examiner

ROGER S. GAITHER, Assistant Examiner